United States Patent [19]
Gil et al.

[11] Patent Number: 4,757,203
[45] Date of Patent: Jul. 12, 1988

[54] APPARATUS FOR ISOTOPE SEPARATION OR MASS ANALYSIS BY A MAGNETIC FIELD

[75] Inventors: Christophe Gil, Igny; Christian Gonella, Saint Maurice Montcouronne; Pierre Louvet, Palaiseau, all of France

[73] Assignee: Commissariat a l'Energie Atomique, Paris, France

[21] Appl. No.: 39,917

[22] Filed: Apr. 20, 1987

[30] Foreign Application Priority Data

Apr. 18, 1986 [FR] France ................................ 86 05595

[51] Int. Cl.[4] ............................................ H01J 49/42
[52] U.S. Cl. .................................... 250/291; 250/290; 250/281
[58] Field of Search ........................ 250/291, 290, 281

[56] References Cited

U.S. PATENT DOCUMENTS 4,059,761 11/1977 Dawson ............................ 250/287
4,081,677 3/1978 Dawson ............................ 250/290

FOREIGN PATENT DOCUMENTS 8402803 7/1984 PCT Int'l Appl. .

Primary Examiner—Carolyn E. Fields
Assistant Examiner—John A. Miller
Attorney, Agent, or Firm—Cesari and McKenna

[57] ABSTRACT

Apparatus for isotope separation or mass analysis of a magnetic field comprises, in a tight enclosure, an ion source of a mixture of isotopes, an accelerating grid and a magnetic assembly surrounding the enclosure for the bringing into cyclotron resonance of one of the isotopes of the mixture, an assembly for collecting the resonant ions and a plate for collecting said ions. The spacing between the rings or turns of the helix is chosen in such a way as to take account of the increase in the Larmor radius and the initial perpendicular velocity of the ions emitted by the source. Application to isotope separation and mass analysis by magnetic field.

5 Claims, 1 Drawing Sheet

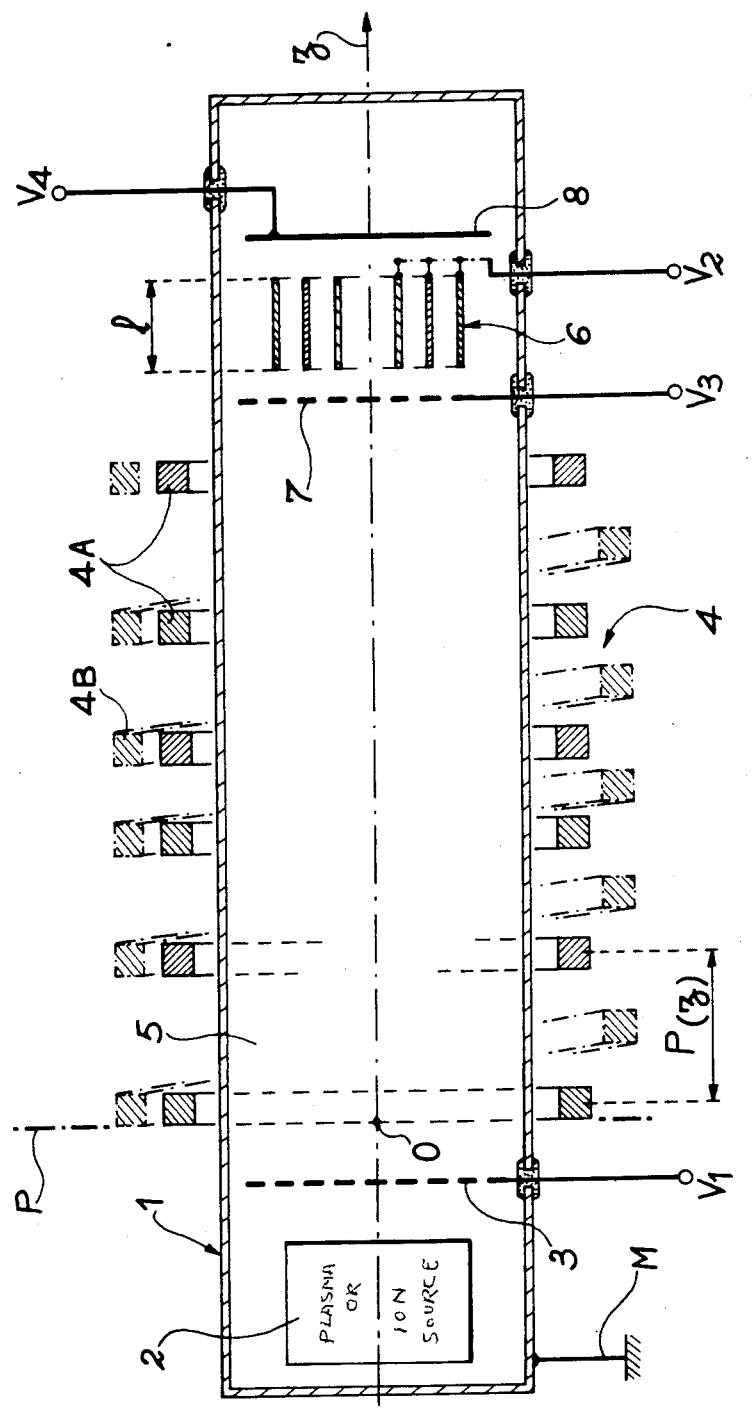

4,757,203

APPARATUS FOR ISOTOPE SEPARATION OR MASS ANALYSIS BY A MAGNETIC FIELD

BACKGROUND OF THE INVENTION

The present invention relates to an apparatus for isotope separation or mass analysis by a magnetic field. It applies to the isotope separation of the ions of a mixture of isotopes or to mass analysis.

It is known that the phenomenon of cyclotron resonance obtained by the electromagnetic effect was firstly observed on the electrons of the first cyclotrons. The application of cyclotron resonance to the ions of the isotopes of uranium for the enrichment of one of these isotopes was used in the case of the Manhattan project. Rapid advances in plasma physics led to research being taken up again as from 1970 in France and then in the U.S.A., where it led to the construction by the TRW company of an apparatus for isotope separation by said process using a uniform magnetic field. This apparatus is described in the journal "annales des mines", February/March 1983 in an article entitled "Research and development of uranium isitope separation in France" (original in French), pp 13 and 14. Isotope separation by this longitudinally extending apparatus is obtained by energy transfer between an electromagnetic wave and ions.

In a similar process, the perpendicular energy of the ions is increased as a result of the resonance effect observed, under certain conditions, when the particles are injected into a magnetic field which is periodically spatially modulated along the axis of the apparatus. Such a process is particularly by described in "Journal de physique lettres", No. 46, 15.8.1985, pp. L745 to L749 in an article entitled "Heating particles in a periodic magnetic structure" (original in French).

It can be gathered from this article that the particles describe a helical trajectory, whose diameter increases exponentially with time. Experimental and theoretical studies reveal that an essential condition for permitting a longitudinal energy transfer (parallel to the axial field) to transverse energy is a parametric resonance condition given by the relation $V_{\|o} = \Omega_{co}(\lambda_o/2\pi)$, in which:

$\Omega_{co}$ designates the cyclotron pulsation of the ions considered (inverse of the time taken by an ion to perform a complete revolution, i.e. 2 radians on its trajectory in a mean amplitude field $B_O$);

$V_{\|o}$ designates the mean velocity of the resonant ions parallel to the direction of the modulation magnetic field (axial field), said field having a mean amplitude $B_O$;

$\lambda_O$ designates the wavelength of the spatial modulation of the magnetic field in a longitudinal direction (parallel to the axis of the apparatus).

In a strictly regular and cylindrical, periodic magnetic structure, the shape of the magnetic field $B_z$ parallel to the axis Z of said structure is e.g. written:

$$B_z = B_o(1 + \epsilon \sin k_o \cdot z)$$

with $k_o = 2\pi/\lambda_o$.

In this relation, as hereinbefore $B_o$ designates the mean component of the axial magnetic field $B_z$ and $\epsilon$ designates the half-amplitude of the maximum variation of the component of the axial magnetic field $B_z$ about the mean amplitude $B_o$ of said field. Thus, when $k_o \cdot z = 1$, it is possible to write:

$$B_{zmax} = B_o(1 + \epsilon)$$

However, when $k_o \cdot z = -1$, the minimum value of the axial magnetic field can be written:

$$B_{zmin} = B_o(1 - \epsilon)$$

Thus, the amplitude of the maximum variation of the component of the magnetic field about the mean component $B_o$ of said field has the value:

$$\Delta B = B_{zmax} - B_{zmin} = 2\epsilon \cdot B_o$$

This type of magnetic structure is in particular that described in "Journal de physique lettres", and does not make it possible to separate isotopes while:

$$\Delta m/m < \Delta B/B_o = 2\epsilon \quad (1)$$

In this relation $\Delta m = m1 - m2$ represents the difference of the masses m1 and m2 of two isotopes of a mixture, m being the mean mass of two isotopes of the mixture while $m = (m1 + m2)/2$. When the relation (1) is satisfied, the heating of the resonant isotope in the magnetic field is inadequate to expect a correct isotope separation.

The journal "Journal de physique lettres", shows that for resonant ions describing a spiral trajectory of radius R and called the "Larmor radius", account is not generally taken of the increase in the Larmor radius. For example, this is the case in the apparatus described in "Proceedings contributed papers", vol. II, International Conference on Plasma Physics, LAUSANNE, June 27–July 3 1984, p 365. In a tight cylindrical enclosure and along the axis thereof, said apparatus comprises an ion or plasma source and a regular magnetic structure having several regularly spaced magnetic rings along the axis of the enclosure.

In this apparatus, as the magnetic rings are regularly spaced along the enclosure axis, no account is taken of the increase in the Larmor radius and consequently of the initial perpendicular velocity of the ions. Thus, this apparatus, which also has no ion collection system, cannot be used for isotope separation.

The object of the invention is to obviate these disadvantages and in particular to provide an apparatus in which the magnetic assembly is constituted by several magnetic rings or by a spiral winding around the axis of the enclosure, the distribution of the magnetic rings or the spacing between the turns of the magnetic winding obeying a predetermined law taking account of the increase in the Larmor radius and the initial perpendicular velocity of the ions emitted by the source. Thus, this apparatus makes it possible to obtain a correct isotope separation.

SUMMARY OF THE INVENTION

Thus, the present invention specifically relates to an apparatus for isotope separation by a magnetic field having a tight enclosure and from upstream to downstream of an axis of said enclosure, an ion source of a mixture of isotopes located in the enclosure, an accelerating grid located in the enclosure facing the source downstream thereof for accelerating the ions from said source, a magnetic assembly surrounding the enclosure for bringing into cyclotron resonance the ions of one of the isotopes of the mixture, said magnetic assembly being located on the path of the ions downstream of the accelerating grid, whereby said magnetic assembly comprises several identical magnetic rings all being constituted by a cylindrical helical winding of magnetic turns, said rings or said winding having as its axis that of the enclosure, the ions brought into cyclotron resonance passing through circular helixes defined by their radius of gyration, called the Larmor radius, a resonant ion collecting assembly located in the enclosure downstream of the magnetic assembly for collecting the resonant ions from the magnetic assembly and a collecting plate in the enclosure, downstream of the collecting assembly and perpendicular to the axis, for collecting the non-resonant ions which have not been retained by the plates, wherein the spacing between two successive turns of the helix or between two rings of the magnetic assembly is determined by the relation:

$$P(z)=\lambda_o[1+(V_{\perp o}/V_{\|o})^2(1-\text{Ch}^2(\epsilon \cdot k_o \cdot z/4))]^{+\frac{1}{2}}$$

$P(z)$ designating the spacing between two successive turns or two rings surrounding the abscissa point z on the axis of the enclosure, the origin of the abscissas being the intersection of the axis of the enclosure with a plane perpendicular to said axis and defining the magnetic assembly at one end thereof on the side of the source, $V_{\perp o}$ designating a predetermined mean velocity of the resonant ions in a direction perpendicular to the axis (Z), $V_{\|o}$ designating the predetermined mean velocity of the resonant ions in a direction parallel to the axis of the enclosure, $\epsilon$ the half-amplitude of the maximum variation of the component of the magnetic field parallel to the axis, about the mean amplitude $B_o$ of said field, $k_o$ designating a constant defined by the relation $k_o = \Omega co/V_{\|o}$ and $\Omega co$ being the cyclotron pulsation of the resonant ions.

According to another feature, the resonant ion collecting assembly comprises plates parallel to the axis, two consecutive parallel plates being spaced by a distance close to, but less than twice the gyration radius of the resonant ions from the magnetic assembly.

According to another feature, the resonant ion collecting assembly comprises coaxial cylindrical tubes having the same axis as the enclosure, two consecutive tubes being spaced by a distance close to, but less than twice the gyration radius of the resonant ions from the magnetic assembly.

According to another feature, the length of the plates of the collecting assembly, in the direction of the axis, is close to, but greater than $2\pi \cdot V_{\|}/\Omega co$, $V_{\|}$ designating the velocity of the resonant ions from the magnetic assembly.

According to another feature, the apparatus also comprises a decelerating grid for the resonant ions, located between the magnetic assembly and the collecting assembly of the resonant ions.

DESCRIPTION OF THE DRAWING AND PREFERRED EMBODIMENTS

The invention is described in greater detail hereinafter relative to the attached drawing, which diagrammatically shows in longitudinal section, an apparatus for isotope separation by magnetic field according to the invention.

The apparatus shown in the drawing comprises e.g. a cylindrical tight enclosure 1 and, from upstream to downstream of an axis z of said enclosure, a source 2 of ions or plasma of an isotope mixture, the source 2 being located within the enclosure.

The apparatus also comprises a grid 3 for accelerating the ions from the source. This grid faces said source, downstream thereof and accelerates the ions coming from the source. It is raised to a positive potential $V_1$ by a not shown electric source, in the case where the ions from the source are negative ions. Conversely, said grid is brought to a negative potential, if the ions from the source are positive ions. Enclosure 1 is brought to the potential of a reference ground M.

A magnetic assembly 4 surrounds the enclosure and, in known manner, makes it possible to bring into cyclotron resonance ions from one of the isotopes of the mixture from source 2. This assembly is located on the path of the ions, downstream of accelerating grid 3 and surrounds enclosure 1. It comprises several indentical magnetic rings 4A and can optionally be constituted by a helical winding of turns 4B, shown in broken line form in the drawing. The magnetic turns are wound in accordance with a cylindrical helix. The rings 4A or magnetic turns 4B have the same axis as the enclousre. The ions brought into cyclotron resonance, in known manner, follow helical trajectories defined by their gyration or Larmor radius.

The apparatus also comprises a collecting assembly 6 formed by conducting plates parallel to the enclosure axis z. This assembly located in the enclosure downstream of magnetic assembly 4, in known manner, makes it possible to collect the resonant ions from magnetic assembly 4. For the positive ions, the plates of assembly 6 can be brought to a negative potential $V_2$ by a not shown electric source. Conversely, for the negative ions, the parallel plates are brought to a positive potential $V_2$. A decelerating grid 7 can be positioned between magnetic assembly 4 and the resonant ion collecting plates 6. In the case of positive ions, the decelerating grid 7 is brought to a positive potential $V_3$ by a not shown electric source. This decelerating grid is brought to a negative potential, when the resonant ions from the magnetic assembly 4 are negative ions.

Finally, the apparatus comprises a collecting plate 8 located in the enclosure downstream of the plate assembly 6. This collecting plate, perpendicular to the enclosure axis z, makes it possible to collect non-resonant ions not retained by the assembly of parallel plates 6. In the case of negative ions, the collecting plate 8 is raised to a positive potential $V_4$, whilst in the case of positive ions, the plate 8 is raised to a negative potential.

According to the invention, a spacing $P(z)$ between two successive rings or two successive turns of the helical winding of magnetic structure 4 is defined. The rings or the helical magnetic winding can be constituted by ring-shaped magnets or by a helical shaped magnet. These rings or said helical winding can also be constituted by super-conductor magnets or electromagnetic coils.

According to the invention, the spacing $P(z)$ between two rings or two successive turns of the magentic assembly is no longer constant and is instead variable in order to produce a modulated magnetic field taking account of both the initial perpendicular velocity ($V_{\perp o}$) and the initial parallel velocity $V_{\|o}$ of the ions from the source, said spacing $P(z)$ being given by the formula:

$$P(z)=\lambda_o[1+(V_{\perp o}/V_{\|o})^2(1-\text{Ch}^2(\epsilon \cdot k_o \cdot z/4))]^{+\frac{1}{2}}$$

in which:

P(z) designates the spacing between two successive turns or two rings for an ordinate point z along the enclosure axis. The origin of the abscissas z on said axis is taken at the intersection point of the enclosure axis with a plane P perpendicular to said axis and defining the magnetic assembly, at one end thereof and on the source side. This origin designated by O in the drawing is in fact the intersection of plane P passing through the face of the first ring or the first turn of magnetic structure 4 facing source 2, and the axis z.

Term $V_{\perp o}$ designates a predetermined mean velocity of the resonant ions in a direction perpendicular to their gyration radius in accordance with the invention (said direction being perpendicular to axis z).

$V_{\parallel o}$ designates a predetermined mean velocity of the resonant ions in a direction parallel to the enclosure axis z.

Terms $\epsilon$, $k_o$ and $\lambda_o$ were defined hereinbefore.

With a magnetic assembly having said structure, the heating of the resonant ions is much more effective.

The parallel plates of collecting assembly 6 making it possible to collect the resonant ions are spaced by a distance close to, but less than twice the gyration radius of the resonant ions from the magnetic assembly. Thus, the resonant ions describe helixes, so that to enable said ions to be collected or trapped by the plates, they must be spaced by a distance close to the diameter of said helix on leaving the magnetic assembly.

The collecting assembly 6 can also be constituted by coaxial conductive tubes, spaced by a distance close to, but less than double the gyration radius of the resonant ions.

The plates or coaxial tubes of collecting assembly 6 are brought to a retarding potential in order to improve the separating effect of the apparatus. These plates or these conductive tubes must have a very limited thickness.

The length l of the plates or the coaxial tubes of assembly 6 is close to $2\pi \cdot V_{\parallel} \Omega co$, $V_{\parallel}$ designating the velocity of the resonant ions on leaving magnetic assembly 4. Thus, if said length is less than said value, certain of the resonant ions may not be collected by the plates or coaxial cylinders of assembly 6.

The non-resonant ions pass through the assembly of plates or coaxial tubes 6 and are collected on plate 8, which is perpendicular to enclosure axis z and therefore perpendicular to the magnetic field produced by assembly 4.

All the plates or coaxial tubes of collecting assembly 6 can be made from carbon, in order to minimize the pulverization phenomena and can be raised to a temperature making it possible to ensure a good adhesion of the collected resonant ions.

The apparatus can also make it possible to carry out mass analyses. In this case, the signal appearing between two consecutive coaxial tubes or between two plates is collected, amplified and then analyzed in Fourier series in accordance with known methods.

In an application example, the apparatus can be used in the separation of monocharged ions of isotope $^{36}$Ar and $^{40}$Ar of argon. For ions $^{36}$Ar, $V_{\parallel o}=20,000$ m/s and $V_{\perp o}=2,000$ m/s, whilst for ions of $^{40}$Ar, $V_{\parallel o}=18970$ m/s and $V_{\perp o}=1897$ m/s.

These ions have an ion density close to $10^{12}$ cm$^{-3}$ and penetrate a magnetic assembly such that $k_o=62.84$ m$^{-1}$ and $=0.15$. After a travel of approximately 1.50 m and about 15 turns, the gyration radius of the resonant ion increases by approximately a factor of 17, whilst the gyration radius of the non-resonant ion increases on average only by a factor of 2. The cyclotron pulsation has a value of $12.56.10^5$ rd/s, corresponding to a frequency of 200 kHz and a mean magnetic field value of 0.47 Tesla.

With these values, the ratio of the molar fraction of argon 36 to that of argon 40 is approximately 8.5, while the ratio of the initial concentrations is $0.0034/0.9966 \sim 3.4.10^{-3}$, i.e. a purely geometrical separation factor of approximately 10. This separation factor can be improved by a factor of 5 by applying a retarding potential to the collecting tubes or plates of assembly 6.

In another application example, the apparatus can be used in the separation of monocharged ions of isotopes K$^{39}$ and K$^{41}$ of potassium. For ions of K$^{41}$, $V_{\parallel o}=18790$ m/s and $V_{\perp o}=1879$ m/s, whilst for ions of K$^{39}$, $V_{\parallel o}=19260$ m/s and $V_{\perp o}=1926$ m/s. These ions penetrate a magnetic assembly such that $k_o=62.62$ m$^{-1}$ and $=0.075$. After a travel of approximately 2.8 m and 28 turns, the gyration radius of the resonant ion increases by a factor of 6. The cyclotron pulsation has a value of $1.176.10^6$ rd/s, corresponding to a frequency of 187 kHz and a mean magnetic field value of 0.5 Tesla. The purely geometrical separation factor is approximately 6.

What is claimed is:

1. An apparatus for isotope separation by a magnetic field having a tight enclosure and from upstream to downstream of an axis of said enclosure, an ion source of a mixture of isotopes located in the enclosure, an accelerating grid located in the enclosure facing the source downstream thereof for accelerating the ions from said source, a magnetic assembly surrounding the enclosure for bringing into cyclotron resonance the ions of one of the isotopes of the mixture, said magnetic assembly being located on the path of the ions downstream of the accelerating grid, wherein said magnetic assembly comprises several identical magnetic rings all being constituted by a cylindrical helical winding of magnetic turns, said rings or said winding having as its axis that of the enclosure, the ions brought into cyclotron resonance passing through circular helixes defined by their radius of gyration, called the Larmor radius, a resonant ion collecting assembly located in the enclosure downstream of the magnetic assembly for collecting the resonant ions from the magnetic assembly and a collecting plate in the enclosure, downstream of the collecting assembly and perpendicular to the axis, for collecting the non-resonant ions which have not been retained by the plates, wherein the spacing between two successive turns of the helix or between two rings of the magnetic assembly is determined by the relation:

$$P(z) = \lambda_o [1 + (V_{\perp o}/V_{\parallel o})^2 (1 - \text{Ch}^2(\epsilon \cdot k_o \cdot z/4))]^{+\frac{1}{2}}$$

P(z) designating the spacing between two successive turns or two rings surrounding the abscissa point z on the axis of the enclosure, the origin of the abscissas being the intersection of the axis of the enclosure with a plane perpendicular to said axis and defining the magnetic assembly at one end thereof on the side of the source, $V_{\perp o}$ designating a predetermined mean velocity of the resonant ions in a direction perpendicular to the axis (Z), $V_{\parallel o}$ designating the predetermined mean velocity of the resonant ions in a direction parallel to the axis of the enclosure, $\epsilon$ the half-amplitude of the maximum variation of the component of the magnetic field parallel to the axis, about the mean amplitude $B_o$ of said field, $k_o$ designating a constant defined by the relation $k_o = \Omega co / V_{\parallel o}$ and $\Omega co$ being the cyclotron pulsation of the resonant ions.

2. An apparatus according to claim 1, wherein the resonant ion collecting assembly comprises plates parallel to the axis, two consecutive parallel plates being spaced by a distance close to, but less than twice the gyration radius of the resonant ions from the magnetic assembly.

3. An apparatus according to claim 1, wherein the resonant ion collecting assembly comprises coaxial cylindrical tubes having the same axis as the enclosure, two consecutive tubes being spaced by a distance close to, but less than twice the gyration radius of the resonant ions from the magnetic assembly.

4. An apparatus according to claims 2 or 3, wherein the length of the plates of the collecting assembly, in the direction of the axis, is close to, but greater than $2\pi . V_{\parallel} \Omega co$, $V_{\parallel}$ designating the velocity of the resonant ions from the magnetic assembly.

5. An apparatus according to claim 1, wherein it also comprises a grid for decelerating the resonant ions located between the magnetic assembly and the resonant ion collecting assembly.

* * * * *